Figure 1:
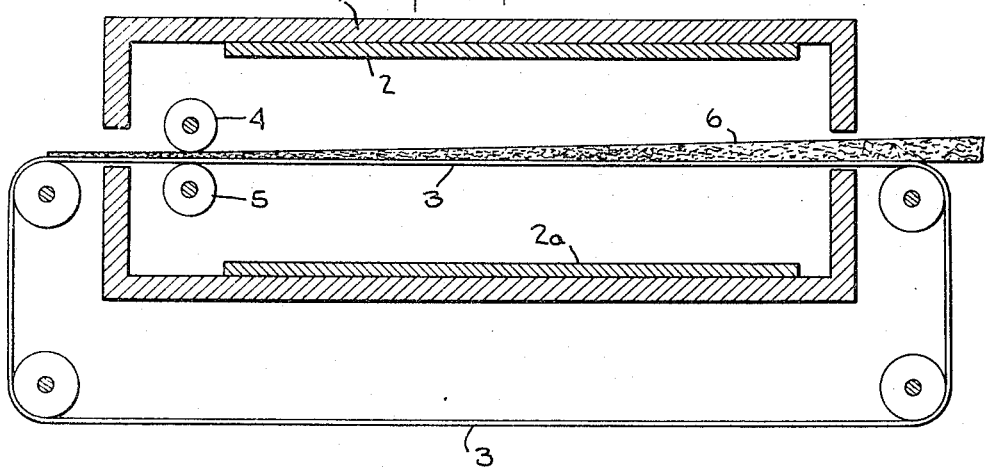

INVENTORS
HENRI BRION
MARCEL LEVECQUE
BY
Bauer and Seymour
ATTORNEYS

United States Patent Office 3,328,230
Patented June 27, 1967

3,328,230
FIBER GLASS PRODUCT AND METHOD OF MAKING IT
Marcel Levecque, Saint-Gratien, and Henri Brion, Livry-Gargan, France, assignors to Compagnie de Saint-Gobain, Neuilly-sur-Seine, France
Filed Mar. 4, 1963, Ser. No. 262,804
Claims priority, application France, Apr. 3, 1956, 711,876
14 Claims. (Cl. 161—150)

The present invention concerns the manufacture of sheets, plates, or shaped pieces composed of glass fibers or similar fibrous thermoplastic mineral materials interlaced and bonded together so as to constitute a cohesive product. When organic fibers are so assembled they are called felted and we may use the same word in a comparative sense. The fibers may be regularly organized or lie at haphazard.

This application is a continuation-in-part of U.S. application Ser. No. 649,109, filed Mar. 28, 1957, now abandoned, and U.S. application Ser. No. 656,510, filed May 2, 1957, now Patent No. 3,007,813 issued Nov. 7, 1961.

According to a known process for preparing such a felted mass by agglomeration, the fibers are softened by heating and compressed so as to obtain a linking at their points of contact. The products thus obtained have the disadvantage of brittleness and have no great mechanical strength, because, among other things, as we have discovered, the multiplicity of autogenously connected, "welded" contact points do not allow any relative displacement and paralyze the natural elasticity of the fiber.

The present invention has for an object to prepare, from glass fibers of the same material and by means of autogenous action, pieces which have a certain elasticity and porosity, besides great cohesion and good mechanical strength.

In accordance with the invention, a mixture of at least two different categories of fibers of the same material but different thermoplastic properties, one kind having a softening point considerably lower than the others, are collected into a mass and agglomerated. In this way the temperature at which these fibers begin to exhibit such phenomena as softening and melting, may differ by a hundred degrees or more.

According to a first characteristic of the invention, one obtains glass fibers of the same material but with different thermoplastic properties by subjecting glass fibers of a similar composition, as they are drawn, to different cooling conditions. For example, if fibers are drawn of the same size and composition, but one of them is cooled more rapidly than the other, the fibers will have different thermoplastic properties which will show itself in differences such as melting point and degree of temper. Such differing fibers can also be produced by using different temperatures of fibering on glass of similar constitution.

The applicants have ascertained that two fibers of the same material and diameter, if produced at different fibering temperatures, or under different cooling conditions, or both, will have different thermoplastic properties. These properties can be materially differentiated by selection of the fibering temperature and/or by control of the hardening conditions used on the fibers in the course of production.

The physical properties of fibers, in particular their thermoplastic properties, will also vary as a function of their diameters, when subjected to a single type of cooling, such as flowing with air at room temperature.

The heating of products by means industrially used today is easily controlled with a precision of less than 20° C. for a product heated to about 700° C. This precision is more than sufficient in the present case. The apparatus used in making the fibers and agglomerating them does not require special or unusual means for controlling the temperature.

According to another and preferred characteristic of the invention, the mixture to be agglomerated is made up of a mixture of fine fibers, in general lower than 5 microns diameter, and of thicker fibers, but generally lower than 30 microns diameter. In this case the applicant has established that the agglomeration can be realized under particularly favorable conditions, by following the formula of composition by size: if it is agreed to call $d$ the average diameter of those fibers whose percentage is maximum in the mixture which is to be agglomerated, the quantity of fibers whose diameter is less than $d/2$ must be equal at least to 20% of the whole, while the quantity of fibers of a greater diameter than $2d$ must be less than 10% of the whole. This formula is as valid for values of $d$ lower than 5 microns, as for higher values, of 9 to 12 microns.

In the course of their labors, the applicants have been able to establish that an important condition for obtaining a good agglomeration is to develop the surface of the fibers to the maximum. However, if only fine fibers are utilized, sheets, plates, or pieces are obtained, after agglomeration, which are very dense and have little or no elasticity. If both fine and thicker fibers are utilized at the same time, the applicants have observed that products of great cohesion with a certain elasticity are obtained.

If the objects of this invention are to be obtained satisfactorily there must be at least two groups of fibers, which differ enough in softening points that one of the groups will soften to autogenous welding temperature and be bonded to contacting fibers at their points of contact while the other group is still unsoftened and incapable of attaching itself to other fibers, although the softened fibers can attach themselves to it.

The fibers can be prepared by any known process, notably by mechanical drawing out, by fluid blowing, or by centrifugation.

The fibers produced at different temperatures and under different conditions of cooling can be produced by a plurality of producing systems or by a single producing system whose working cycle has been suitably regulated.

In order to accomplish the agglomeration, the mixture of fibers is subjected to a temperature which, in general, is over 300° C. and is preferably between 400 and 700° C., the temperature used being variable according to the nature of the glass.

This heating of the glass should be carefully regulated and quite rapid. In fact, too slow heating has a tendency to stabilize the fiber, that is, to destroy the property that tempered glass fibers have of softening at a lower temperature than their untempered counterparts.

Compositions of glass within the following ranges are especially suited to use in this invention:

| | Percent |
|---|---|
| $SiO_2$ | 57–64 |
| $Al_2O_3$ | 2–5 |
| $B_2O_3$ | 2–12 |
| $CaO$ $MgO$ $BaO$ | 12–20 |
| $Na_2O$ $K_2O$ | 12–15 |
| $F$ | 0–5 |

Such glasses are obtained from a batch of the composition:

| | Kg. |
|---|---|
| Sand | 50–63 |
| Feldspath | 10–24 |
| Dolomite | 10–21 |
| $CaCO_3$ | 0–18 |
| $BaCO_3$ (or $BaSO_4$) | 0–5 |
| $Na_2CO_3$ | 8–20 |
| Dehydrated borax | 3–17.5 |
| $CaF_2$ | 0–7.5 |

By way of example, one can begin with a glass having a composition corresponding to the average of compositions of the above type, that is to say, 60–61% $SiO_2$, 3–4% of $Al_2O_3$, 6.5–7.5% $B_2O_3$, 15.5–16.5% CaO, MgO, BaO, 13–14% alkali, and 2–3% F. With this glass a mixture of fibers is produced whose average diameter $d$ as defined above is of 6 microns. With this mixture of fibers a felt is formed the density of which is 12 kg./m.$^3$ and the thickness is 7 cm. The temperature of the sheet is brought, in less than two minutes, from atmospheric temperature to a temperature of about 600° C.

In the course of this operation, the sheet undergoes a progressive contraction in all its dimensions. This contraction is accompanied by an increase in cohesion and density, the latter being capable of increasing from 10 to 40 kg./m.$^3$, and in the case of very fine fibers, from 6 to 8 kg./m.$^3$ to 600 kg./m.$^3$. The density of the final product can even, in certain cases, go beyond 600 kg./m.$^3$ and attain up to 1500 kg./m.$^3$. The treatment of the felt can be accomplished in a continuous or discontinuous manner.

The operation can be followed, and this constitutes another characteristic of the invention, by a shaping process by passage between rollers or through a calendering system, this passage being effected at a temperature equal to or lower than the temperature of thermal treatment utilized for agglomeration. By changing the temperature of the rollers or calenders, the surface conditions of the sheet can also be modified and an effect be produced on the quality of the products obtained.

Before the operation of agglomeration, the fibers can be moistened by sprinkling or soaking. This moistening achieves improvement in the surface conditions and constitutes a part of the invention. It allows the density to be increased, produces a decrease in the thickness of the sheet, and reduces the contraction in the other dimensions. This moistening also permits the use of a lower temperature for the beginning of agglomeration.

The agglomerated products obtained can be utilized without the addition of any sizing. They thus have maximum proof against attack, maximum resistance to chemical reagents, and partake of the full strength of the mineral fibers of which they are composed.

In order to make composite products the sheets may be made by superposing several sheets each having different values of diameter $d$. For example, by agglomerating together two external layers having low value of $d$, for example of the size of 4 microns, with an internal layer having a $d$ value of about 12 microns, pieces can be formed which, while possessing very hard outer surfaces, retain remarkable elasticity.

An advantage of this process is that production of plates of differing character, having interconnections proportioned in number to the temperature of heating, having few interconnections, and those by only the finest fibers, when the temperature of agglomeration is just above the softening point of the finest fibers, and generating a more substatnial number of weld connections as the temperature of heating approached the softening point of the gross fibers. As the plate is the stiffer, the greater the number of welds between fibers, this enables the factory to produce and reproduce different degrees of flexibility.

In order to attain the invention, the temperature must be controlled as aforesaid and the proportion of fine to gross fibers must be observed.

Threads or tissues of glass, capable of acting as strengtheners in the final product, can be introduced into the starting sheet or between two sheets. The threads are very useful when the body of the product is composed largely of short lengths of glass.

FIG. 1 of the drawings schematically represent a device for putting a process according to the invention into operation.

Figure 2:
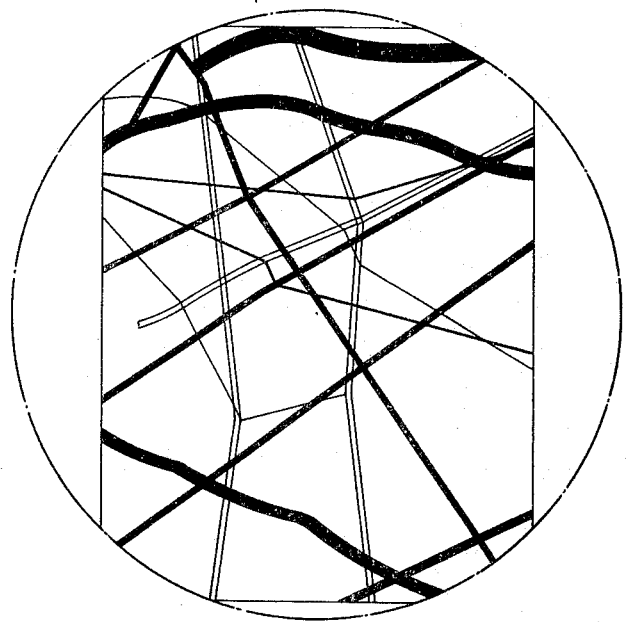

FIG. 2 is a drawing of a photomicrograph which was taken through the novel product made by the novel process.

This device consists essentially of a tunnel furnace 1 carrying over all, or part of, its inside walls, heating elements such as electric resistances 2–2a. Inside the furnace passes, within such range of the heaters as to make the fibers cohere, a conveyor belt 3. Toward its discharge opening are placed heated conforming rollers 4–5 which act calender-like to work the product. These may be mounted so that they may be moved out of operating position.

Sheet 6 of fibers to be agglomerated passes over belt 3 and is carried along the length of the furnace. During its passage in the furnace, it is raised to temperatures appropriate to agglomeration.

It must be understood that the device which has just been described is only given as an example; thus, the heating can be obtained by all suitable other methods. Other conveyors than belts can be used in the furnace. The advance of the sheet, gliding on a part or the whole of the interior wall of the furnace can be secured by the conforming rollers; bearing rollers can also be used.

The following examples illustrate the invention without detracting from the generality of the foregoing.

EXAMPLE 1

A glass batch was made by mixing:

| | Kg. |
|---|---|
| Sand | 51 |
| Feldspath | 14 |
| Dolomite | 16 |
| $BaCO_3$ (or $BaSO_4$) | 3 |
| $Na_2CO_3$ | 15 |
| Dehydrated borax | 10.5 |
| $CaF_2$ | 4 |

This batch was melted in a crucible at a temperature of about 1250° C. by standard techniques of melting and fining, producing a glass have the composition 60–61% $SiO_2$, 3–4% $Al_2O_3$, about 7% $B_2O_3$, about 16% total of CaO, MgO, BaO, 13–14% alkali oxides, and 2–3% F.

The crucible was provided with nipples of two sizes in the bottom, one size producing fibers of smaller and the other of larger size. The drawing took place at a crucible temperature of 1100° C. and the drawn fibers were wound on a rotating drum. It was decided to run the test on fibers of 5 and 12 microns average diameter respectively and the drum was rotated at a speed which produced the five-micron fibers from the small nipples and the twelve-micron fibers from the larger ones. The fibers were cooled between the nipples and the drum to about 150° C. and were not interconnected. The softening points of the two sizes of fiber differed by 80° C., the smaller being the lower melting.

After the mat of fibers on the drum had attained a depth of thickness of one inch the drum was stopped, the fibers issuing from the nipples were transferred to another drum, the mat was cut off the first drum, chopped to lengths not exceeding about 3, mixed in a hood and dropped onto a travelling belt, as in FIG. 1 which moved toward a tunnel furnace.

The temperature in the tunnel into which the belt introduced the fibers raised the temperature of the smaller fibers to above their temperature of welding to about 625° C. and the temperature of the larger fibers because of their larger size, to about 70° less than their welding temperature. Thus the smaller fibers were softened so that they would autogenously weld themselves to any fiber, small or large, with which they came in contact. The larger fibers being below their softening points, could not attach themselves to other large fibers. The mat gradually collapsed. The calender was not used. The time of heating in the tunnel was two minutes.

The resulting plate was composed of fibers of two different sizes interconnected only by the fibers of smaller size.

After the agglomeration, the plate was drawn from the tunnel and cooled in the air.

The mat before entering the tunnel furnace was 1 inch thick, and at discharge was ⅛″ thick. Its width was substantially reduced about 12%. Its density after discharge was about 100 kg./m.³.

The characteristics of this plate can be determined by comparison with a similar plate made by a process in which fibers of similar mixed sizes are also used but in which both the larger and smaller sizes of fiber are heated to softening temperature so that the large fibers weld themselves to small and large fibers in addition to the welding by small fibers to all fibers. The wholly interwelded type is extremely brittle, and dense, and not useful for battery separators or ceiling panels. The new product has welded joints only where fine fibers are found, is relatively flexible, less dense, not as brittle, and makes excellent battery separators and ceiling panels.

EXAMPLE 2

A centrifugal spinning machine was used, and molten glass similar to that of Example 1 was introduced to the inside of a centrifugal spinner having ten horizontal, vertically arranged rows of orifices. The fibers were blasted by hot gases projected downwardly past the orifices. The temperature of the gases at the top row was about 1550° C. and that at the bottom was about 1250° C. This produces fibers varying from less than five microns to 30 microns, the percentage of sizes of diameter less than $d/2$, $d$ being the average diameter of all fibers, being about 25% of the whole and the percentage of sizes of diameter $2d$ being about 8% of the whole. The difference in softening point between the fine and gross fibers was about 100° C.

The fibers fell at random on the surface of the travelling belt as in Example 1 and were admitted to an oven in which they were brought to a temperature about 40° C. above the softening point of the lower softening fibers and about 60° C. below the softening point of the higher-softening. The lower softening fibers attached themselves to all other fibers at their points of contact and some of the fibers of intermediate size were also welded to others at their points of contact but the gross fibers were not welded to other gross fibers. The mat was reduced from a thickness of 15 mm. to 0.8 mm. by heat collapse.

The characteristics of the plate were similar to the plate of Example 1, being more flexible than the comparative plate in which the gross fibers had been brought to their welding temperatures. The better porosity and flexibility of the new plates is especially useful in battery plate separator service. It appeared under the microscope as in FIG. 2.

EXAMPLE 3

Proceeding as in Example 2, the calender was used to reduce the thickness of the mat to one half that of Example 2. The density was doubled and the porosity reduced somewhat but the mat retained its strength and flexibility.

The calender was composed of two rotating cylinders brought to a temperature slightly lower than the temperature of agglomeration. The surface of the rotating cylinders carried patterns which were during the calendering operations printed over the surface of the panel.

EXAMPLE 4

Proceeding as in Example 2 a calender was used which was composed of a male and female cylinder both reproducing the same pattern, in relief over the surface of one cylinder and sunk into the surface of the other. This produced a corrugated sheet especially suited in battery plate separators.

EXAMPLE 5

Fibers are drawn from two groups of nipples provided each in the bottom of a different crucible. The drawing temperature was for one group of nipples of 1020° C., and of 1150° C. for the other group. The size of the nipples was adjusted to obtain fibers of 10 m$\mu$ from both groups of nipples, the fibers being in both cases drawn on to drums rotating at the same speed. Therefore, the cooling conditions were the same for both groups of fibers. The difference between the corresponding softening points was for the two groups of fibers, of some 50° C. The fiber mats were cut off the drums, chopped to convenient size, less than 3 cm. in general, mixed thoroughly, and dropped evenly onto a travelling belt. The further treatment was as Example 1, the temperature being halfway between the softening points of the two kinds of fiber.

The product had the characteristics of the new product, being held together largely by the fine fibers, the gross not being welded at their points of contact.

EXAMPLE 6

Before the mattress entered the tunnel, as in Example 1, it was moistened throughout by spraying with water. The process was otherwise as in Example 1. The product had greater density than that of Example 1, was thinner, and contracted less in width. The temperature required in the furnace was 10° C. less than in Example 1, indicating a saving of heat. A somewhat different surface resulted.

EXAMPLE 7

Preparation of a laminated product.

Two mats of fibers are obtained by the process of Example 2. One mat is brought to a temperature slightly higher than the temperature of sintering of the fine fibers and the other mat to a temperature slightly lower than the temperature of sintering of the gross fibers. Both mats are then immediately put face to face and joined together by passing through a calender. A laminated product is thus produced, the density of the layer which has been brought to a higher temperaturre being more elevated. A sandwich product can easily be obtained by the same process using three mats instead of two.

EXAMPLE 8

Proceeding as in Examples 1, 2 or 5, continuous glass threads are introduced into the hood where the fibers are dropped onto the traveling belt. The heat treatment of the mat containing the continuous threads is not modified.

An advantage of the process is the discovery that a superior sheet is made by using only the finer fibers to form the interconnections. Another advantage is that the plate retains its strength better under the calender and can be reduced to thinner dimensions than prior art types having large fiber interconnections, even to densities on the order of 1500 kg./m.³, without disrupting the plate.

The invention is useful with all types of glass; composition is not of the essence, although it can be used to establish particular softening points for the fibers.

The products of the process are superior to all known products of similar sort particularly in their flexibility and decreased brittleness. They can be made in almost any desired density within the limits stated, and in this respect they differ from prior types in that they still remain integral where prior types crumble. The brittleness of prior art products was such that successful lamination could not be carried out, crumbling, cracking, and breaking occurring in such a large proportion of cases that the process was not feasible. Hence it is possible to achieve thin and dense pieces without losing porosity, as well as to produce lighter and more open constructions.

As many apparently widely different embodiments of the present invention may be made without departing from the spirit and scope thereof, it is to be understood that the invention is not limited to the specific embodiments.

What is claimed is:

1. A new product of manufacture composed of an agglomeration of at least two different kinds of fibers, formed of the same material but having different diameters and different thermoplastic properties, the mixture of fibers comprising a percentage of at least 20% of fine fibers of a diameter inferior to about 5 microns and to the half of the diameter of the fibers existing in the mixture in a maximum proportion, and not substantially more than 10% of fibers of a diameter substantially greater than 5 microns, inferior to about 30 microns, and superior to two times the diameter of the fibers existing in maximum proportions.

2. The method of making felted glass bodies that comprises forming a mattress containing glass fibers having different thermoplastic properties and a substantial but minor percentage of fine glass fibers having an average diameter not over about 5 microns and a substantial and major percentage of coarser glass fibers having an average diameter within a range having a minimum substantially above said average and a maximum about 30 microns, and heating the mass above the temperature of welding of the fine fibers and under the temperature of welding of the coarser fibers until the fine fibers weld and the mattress collapses, and cooling the product.

3. A method of making porous, fibrous glass sheet plates and the like which comprises forming a loose mattress of glass fibers comprising at least two categories of fibers having each the same chemical composition but different thermoplastic properties, moistening the mattress, heating said mattress to a temperature higher than the temperature of welding of at least one category of fibers and lower than the temperature of welding of at least one category of fibers and cooling the product.

4. Process for the manufacture of products composed of agglomerated glass fibers consisting in heating a blanket comprising at least two categories of fibers having each the same chemical composition but different thermoplastic properties, to a temperature such that the fibers of one category at least having lower softening points are welded autogenously at their points of contact with other fibers, while the fibers of at least one category having higher softening points are not welded between themselves at their points of contact compressing the collapsed mattress and cooling the sheet thus formed 5. A new product of manufacture composed of an agglomeration of at least two different kinds of fibers, formed of the same material but having different thermoplastic properties, the fibers of the one kind having a softening point substantially inferior to that of the fibers of the other kind, and the fibers being self-joined at some of their points of contact.

6. A method of making felted bodies of glass and the like which comprises forming a loose mattress of glass fibers of the same composition of at least two diameters, fine and gross, both of which are less than about 30 microns in diameter and of which the smaller are not substantially thicker than d/2, are present in at least 20% of the whole, and having softening point substantially below that of the coarser kind, and in which the coarser kind does not substantially exceed 10% of the whole and has an average size at least about 2d, d being the average diameter of all the fibers, heating the mattress to at least the softening temperature of the fine fibers, terminating the rise in temperature before the softening temperature of the gross fibers is reached, continuing the heating until the fine fibers have been autogenously attached to contiguous fibers, and cooling the body.

7. A new product of manufacture composed of an agglomeration of at least two sizes of fiber, fine and gross, all being not substantially larger than 30 microns in diameter, the fines being present in a quantity greater than the gross, the fibers being united into an integrated body by the fines, which are autogenously bonded to contiguous fibers at their points of contact, and the gross fibers being largely unbonded to other gross fibers.

8. The method of claim 4 wherein the collapsed mattress is calendered between the surfaces of two rotating cylinders.

9. The method of claim 8 wherein the surfaces of the rotating cylinders are brought to a temperature slightly inferior to the temperature of welding fibers.

10. The method of making felted glass bodies that comprises forming a mattress containing glass fibers having different thermoplastic properties and a substantial but minor percentage of fine glass fibers having an average diameter not over about 5 microns and a substantial and major percentage of coarser glass fibers having an average diameter within a range having a minimum substantially above said average and a maximum about 30 microns, and heating the mass above 300° C. and below 700° C. until the fibers join at their points of contact and the mattress collapses, and cooling the product.

11. A method of making porous, fibrous glass sheets, plates and the like which comprises forming a loose mattress of glass fibers a substantial proportion of which have a diameter less than about 5 microns and the remainder a larger diameter but below 30 microns, moistening the mattress, admitting the mattress to an oven which is at a temperature between about 300 and about 700° C., and preferably between 400 and 700° C. until the mattress collapses and its fibers are joined at their points of contact, and cooling the sheet thus formed.

12. A method of making porous, fibrous glass sheets, plates and the like which comprises forming a loose mattress of glass fibers a substantial proportion of which have a diameter less than about 5 microns and the remainder a larger diameter but below 30 microns, different fibers in the mass having softening points differing by at least 100° C., moistening the mattress, admitting the mattress to an oven which is at a temperature between 400 and 700° C. until the mattress collapses and its fibers are joined at their points of contact, compressing the collapsed mattress and cooling the sheet thus formed.

13. Product composed of glass fibers having the same chemical composition which include at least two categories of fibers, thick and thin, the fibers of the thin category being welded at substantially all their points of contact to the fibers of both categories, and the fibers of the thick category being generally unwelded to fibers of the same category.

14. Process for the manufacture of products composed of agglomerated glass fibers which comprises heating a blanket which includes at least two categories of fibers of the same chemical composition, but of which one category has a lower softening point than another, until the fibers of the lower-softening category are welded autogenously at their points of contact with their own and another category of fibers, and maintaining the temperature below that at which the fibers having higher softening points will be welded one to another at their points of contact.

References Cited

UNITED STATES PATENTS

| | | | |
|---|---|---|---|
| 2,328,714 | 9/1943 | Drill et al. | 65—14 X |
| 2,565,941 | 8/1951 | Barnard | 65—9 X |
| 2,728,699 | 12/1955 | Labino. | |
| 2,751,962 | 6/1956 | Dummond | 65—4 |
| 3,007,813 | 11/1961 | Levecque et al. | 117—126 |

DONALL H. SYLVESTER, *Primary Examiner.*

D. CRUPAIN, R. L. LINDSAY, *Assistant Examiners.*